United States Patent
Stein

(10) Patent No.: US 8,757,583 B2
(45) Date of Patent: Jun. 24, 2014

(54) FLUID-WORKING MACHINE

(75) Inventor: Uwe Bernhard Pascal Stein, Edinburgh (GB)

(73) Assignee: Artemis Intelligent Power Limited, Loanhead (GB)

( * ) Notice: Subject to any disclaimer, the term of this patent is extended or adjusted under 35 U.S.C. 154(b) by 940 days.

(21) Appl. No.: 12/440,371

(22) PCT Filed: Sep. 8, 2006

(86) PCT No.: PCT/GB2006/003321
§ 371 (c)(1),
(2), (4) Date: Oct. 26, 2009

(87) PCT Pub. No.: WO2008/029073
PCT Pub. Date: Mar. 13, 2008

(65) Prior Publication Data
US 2010/0084587 A1      Apr. 8, 2010

(51) Int. Cl.
*F16K 31/12*        (2006.01)
*F04B 7/00*         (2006.01)
*F16K 31/40*        (2006.01)

(52) U.S. Cl.
CPC ............. *F16K 31/406* (2013.01); *F04B 7/0076* (2013.01); *F16K 31/40* (2013.01)
USPC ..................................... 251/30.04

(58) Field of Classification Search
USPC ....................... 251/30.01, 30.03, 30.04, 30.02
See application file for complete search history.

(56) References Cited

U.S. PATENT DOCUMENTS

| 4,921,208 | A | | 5/1990 | LaMarca |
| 5,190,446 | A | | 3/1993 | Salter et al. |
| 5,259,738 | A | * | 11/1993 | Salter et al. ................... 417/505 |
| 5,735,582 | A | | 4/1998 | Eith et al. |
| 5,918,852 | A | * | 7/1999 | Otto ........................... 251/30.04 |
| 6,079,796 | A | * | 6/2000 | Schmidt et al. ............ 303/113.2 |
| 2003/0132409 | A1 | | 7/2003 | Birkelund |

FOREIGN PATENT DOCUMENTS

| EP | 0 494 236 | 12/1995 |
| GB | 672696 | 5/1952 |
| GB | 2 079 982 | 1/1982 |
| GB | 2 276 222 A | 9/1994 |

(Continued)

OTHER PUBLICATIONS

Russian Decision to Grant dated Oct. 27, 2010, issued in corresponding Russian Application No. 2009113032, with English translation.

(Continued)

*Primary Examiner* — Eric Keasel
*Assistant Examiner* — Jessica Cahill
(74) *Attorney, Agent, or Firm* — Lowe Hauptman & Ham, LLP

(57) ABSTRACT

In a fluid-working machine having a high-pressure line and a working chamber, a valve arrangement is arranged to control fluid flow from the high-pressure line to the working chamber. The valve arrangement comprises a main valve having a valve element arranged to provide sealing contact with a valve seat, and an auxiliary valve comprising an electromagnetically-movable valve member for equalising pressure on either side of the main valve by placing the working chamber in direct fluid communication with the high-pressure line. The electromagnetically-movable valve member may comprise a spool valve member or a poppet valve member.

20 Claims, 3 Drawing Sheets

(56) References Cited

FOREIGN PATENT DOCUMENTS

| | | | |
|---|---|---|---|
| GB | 2276222 A | * | 9/1994 |
| JP | 51-154728 | | 12/1976 |
| JP | 5-503335 | | 6/1993 |
| JP | 10-169824 | | 6/1998 |
| RU | 2227237 | | 4/2004 |
| SU | 333357 | | 5/1972 |
| WO | WO 2004104463 A1 | * | 12/2004 |

OTHER PUBLICATIONS

International Search Report for PCT/GB2006/003321, mailed Jun. 5, 2007.

UK search report for UK patent application GB0517836.3, (Feb. 23, 2006).

* cited by examiner

FLUID-WORKING MACHINE

This application is the U.S. national phase of International Application No. PCT/GB2006/003321, filed 8 Sep. 2006, the entire contents of which is hereby incorporated by reference.

BACKGROUND TO THE INVENTION

This invention relates to a hydraulic or pneumatic motor or pump (a "fluid-working machine").

EP-B-0494236 introduces a mechanism for actuating electromagnetic poppet valves in a fluid-working machine, using the pre-compression and pre-expansion of the contents of a working chamber to create a motoring cycle of the machine. Working chambers of the machine are selected in real time so that fluid power is controllably converted to shaft power and vice versa, thus allowing a controllable bi-directional energy flow. The nature of poppet valves is that the fluid pressure acts over the seating area creating a large closing force. The motoring cycle of EP-B-0494236 relies on the energy from an already spinning shaft to allow the opening of the solenoid-operated poppet valve against the pressure in the high-pressure manifold. This requirement limits the use of this technique to conditions where the machine is already operating above a threshold shaft speed. For applications with the requirement of starting from zero speed, the motoring cycle must be initiated by different means.

U.S. Pat. No. 5,735,582 describes an electromagnetic valve assembly comprising a master valve and an auxiliary valve, the auxiliary valve serving to open the master valve against a high pressure. In order for the master valve to open, fluid must flow along a capillary between the master valve body and the bore until the pressure is equalised. This means that actuation of the valve assembly requires 200 to 300 ms which is too slow for use in a fluid-working machine.

SUMMARY OF THE INVENTION

It is an aim of the invention to provide a face-seating valve, interposed between the working chamber and the high-pressure manifold of a fluid-working machine, which can open whilst the latter is pressurised and the output shaft of the machine is stationary.

Accordingly, the present invention provides a fluid-working machine according to claim 1. Optional features of the invention are set out in the dependent claims.

The valve arrangement of the invention is capable of functioning because the working chamber is essentially a contained volume and the leakage flow is limited to the sum of the volume change due to compression and fluid leakage from the working chamber.

In operation of the machine of the invention, once the pressure between the high-pressure line and the working chamber has equalised it is possible, with a force of modest magnitude, to move the main valve element into the open position in order to complete the second stage of operation.

It is also possible, and advantageous, for a machine of this type with the integral main and auxiliary valves to function in the same way as in EP-B-0494236. The valve begins with two-stage operation at start-up, continues to use it during low-speed operation and automatically changes to single-stage operation with the pre-compression cycle as speed increases.

BRIEF DESCRIPTION OF THE DRAWINGS

The invention will now be described in more detail, by way of example only, with reference to the accompanying drawings, in which.

DETAILED DESCRIPTION OF PARTICULAR EMBODIMENTS

Figure 1:
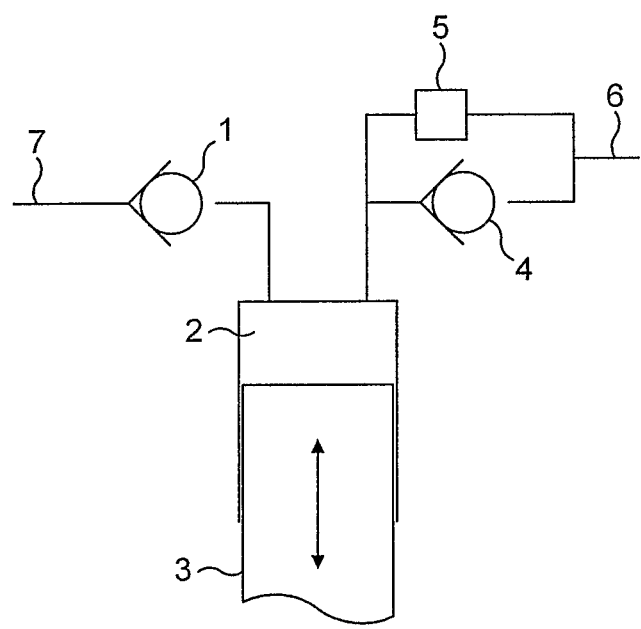
FIG. 1 is a schematic diagram showing the general principle of the invention.

FIG. 1 shows how a fluid-working machine according to the invention operates in a motoring cycle. A solenoid-operated, normally-open, face-seating low-pressure line valve 1 is interposed between the line 7 and a working chamber 2 of cyclically varying volume. A solenoid-operated, normally-closed, face-seating high-pressure line valve 4, interposed between the working chamber and the high-pressure line 6, is connected in parallel with a much smaller pressure-equalising valve 5. The low-pressure line valve 1 has its poppet facing the working chamber 2, while the high-pressure line valve 4 has its poppet facing the high-pressure manifold.

The following is a description of the complete motoring cycle utilising the two-stage high-pressure valve operation.

At the beginning of the motoring cycle the low-pressure line valve 1 is in the open position, and the high-pressure line valve 4 and the pressure equalising valve 5 are in the closed position. The pressure in the high-pressure line 6 is above the pressure of the low-pressure line 7. The pressure in the working chamber 2 equals the pressure of the low-pressure line 7.

The motoring cycle starts with the closing of low-pressure line valve 1 and the piston moving, possibly from rest, towards bottom-dead centre. Next the pressure-equalising valve 5 is commanded to open. With the valves 1, 5 in these positions, the pressure in the high-pressure line 6 and the working chamber 2 will equalise. Once the pressure has equalised, high-pressure line valve 4 can be commanded to open. The working chamber 2 is now connected to the high-pressure line 6 and disconnected from the low-pressure line 7 so that the high-pressure fluid can act on the piston 3 and produce torque on the crankshaft of the machine, through the downstroke. The pressure-equalising valve 5 can be closed as soon as high-pressure line valve 4 has opened or might be left open for the duration of the motoring stroke. Both valve 4 and valve 5 have to be closed before the piston 3 reaches bottom-dead-centre. The remaining expansion of the working space, as the piston 3 reaches its limit condition, will depressurise it and allow low-pressure line valve 1 to open. With this valve in the open position and valves 4 and 5 in the closed position it is now possible to displace the fluid into the low-pressure line 7 as the piston 3 moves toward its top-dead-centre position.

Figure 2:
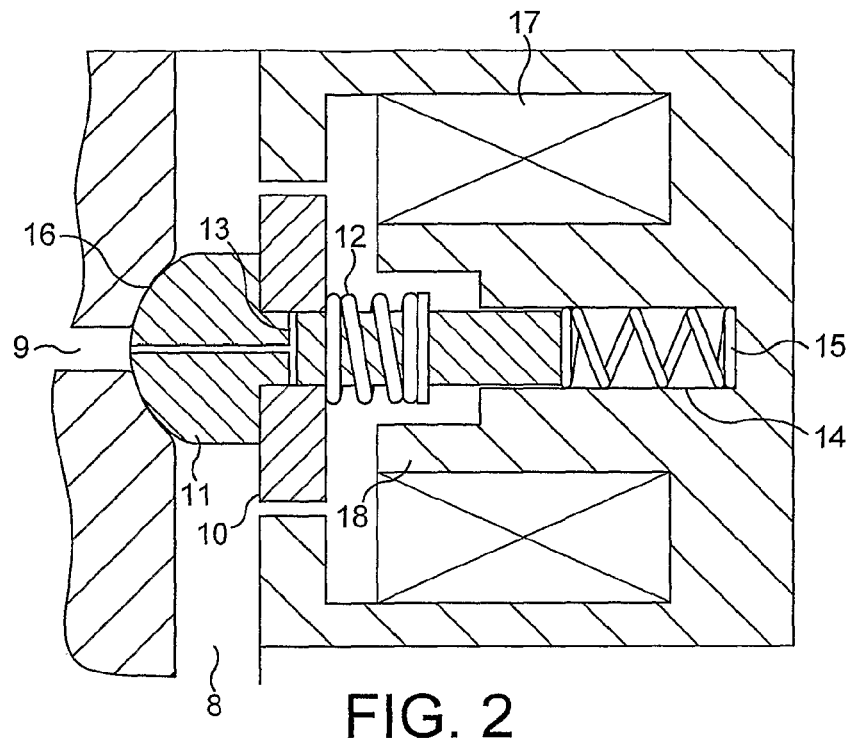
FIG. 2 is a schematic sectional view of a valve arrangement according to an embodiment of the invention is a closed position.
Figure 3:
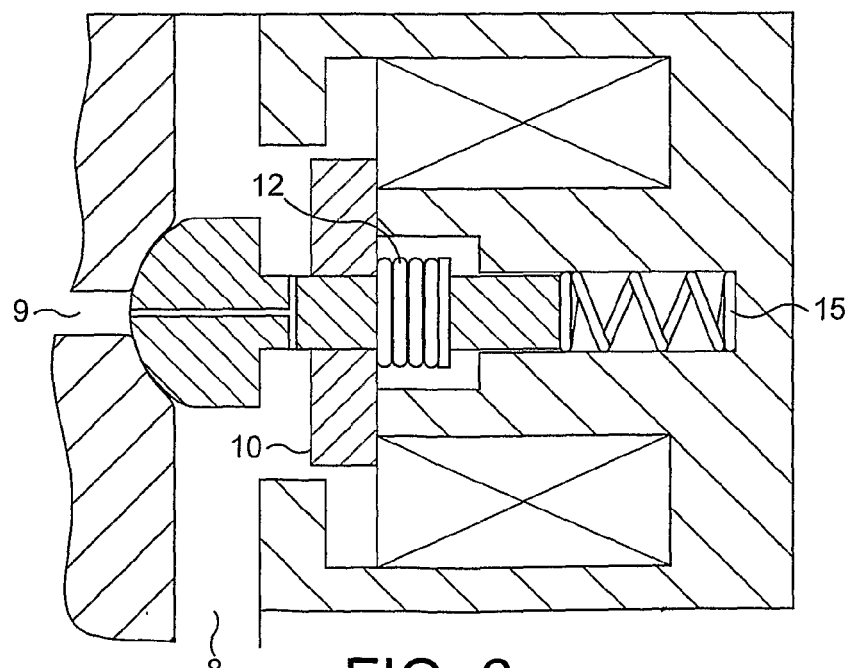
FIG. 3 shows the valve arrangement of FIG. 2 in the first stage of operation.

FIG. 2 shows the pressure equalising valve in the form of a sliding spool valve integrated into the main solenoid operated poppet valve. A fluid chamber 8 is connected to the high-pressure line. A passage 9 is connected to the working chamber. A ferromagnetic moving pole ring 10 can slide along the base of a poppet 11. A pole compression spring 12 forces the moving pole towards the head of the poppet 11. The poppet 10 has a flow channel 13 connecting the fluid chamber 8 and the working chamber passage 9. The moving pole 10 covers the entry to the flow channel when the moving pole 10 is close to head of the poppet 11 and opens the flow channel 13 when it has moved away from the head of the poppet, as shown in FIG. 3. The poppet 11 can slide along a guide 14. A poppet compression spring 15 is employed to force the poppet toward its seat 16. The preload on spring 15 is lower than the preload on pole compression spring 12. A solenoid coil 17 is arranged to create magnetic flux to attract the moving pole 10 towards a static pole 18.

Figure 4:
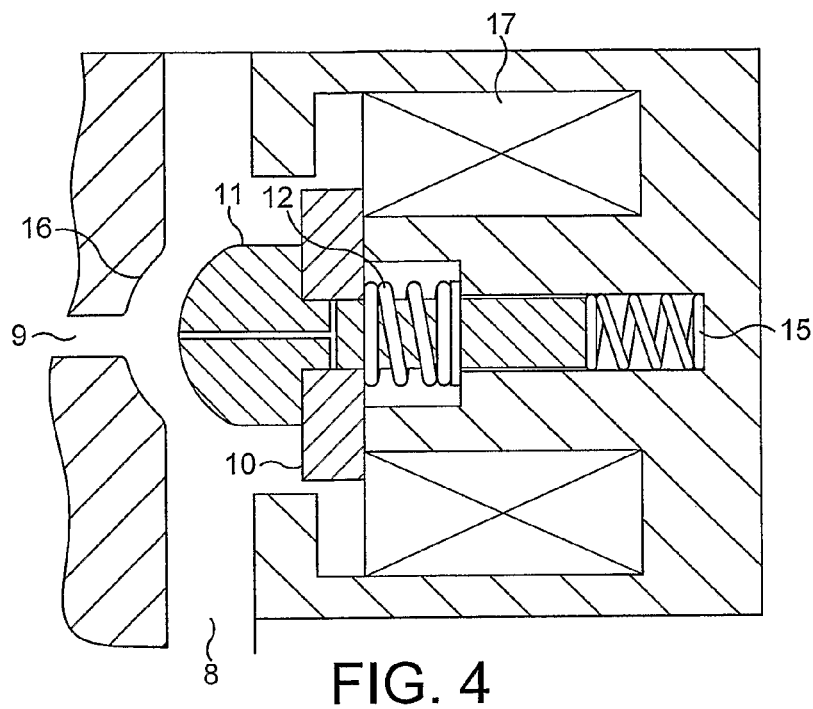
FIG. 4 shows the valve arrangement of FIG. 2 in the second stage of operation.

The pole ring 10 is displaced axially when the coil 17 is energised. This pole ring acts directly on pole spring 12 and, if there is significant pressure gradient between the high-pressure chamber 8 and the passage 9 so that the poppet 11 is held against the seat 16, then the pole ring will slide on the poppet shank and expose the holes 13, as shown in FIG. 3. This connects the two spaces and equalises the pressure across the valve arrangement. Once the pressure is equalised, so long as the force of poppet spring 15 is less than that of pole spring 12 across the full range of displacement, the axial force of pole spring 12 on the poppet shank will pull the poppet 11 away from the seat 16 and open the main fluid passageway, as shown in FIG. 4.

During high cycling rates of the working chamber there will not be sufficient time for this two-stage operation to take place. In this case the solenoid coil of the low-pressure normally-open valve 1 will be energised just before the working chamber reaches its minimum volume condition so that the pressure in the working chamber rises in the closed volume and equals that of the high-pressure manifold and so that, when the coil of the normally-closed valve is energised, the moving pole ring 10 moves in unison with the poppet 11 and opens the valve in a single stage.

Figure 5:
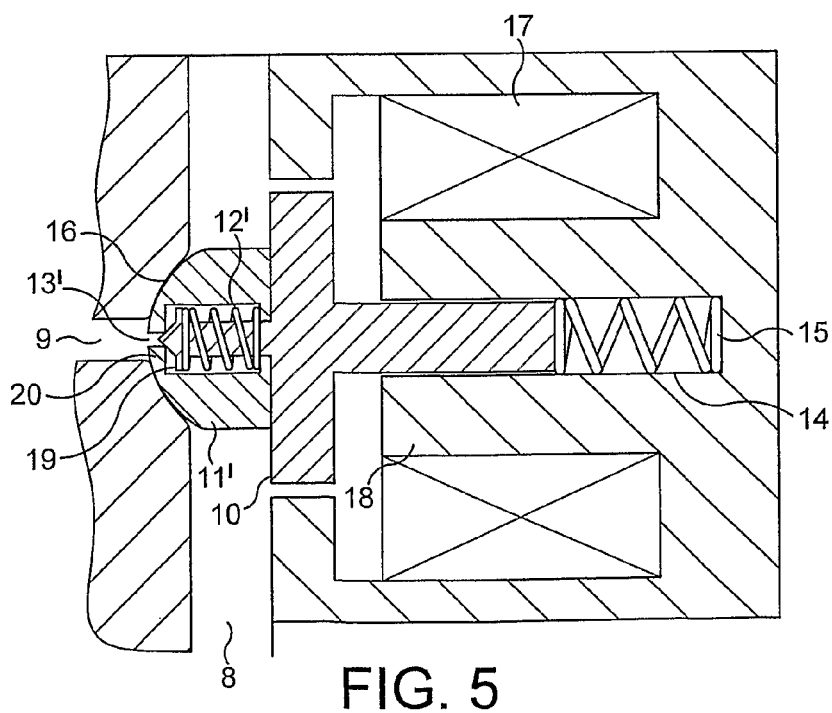
FIG. 5 is a schematic sectional view of a valve arrangement according to an alternative embodiment of the invention.

FIG. 5 shows an alternative pressure equalising valve 5 in the form of an auxiliary poppet type valve 19 integrated into the main solenoid operated poppet valve 11'.

The basic operation is the same as described above. The main difference is the use of auxiliary pressure-equalising poppet valve 19 rather than a sliding of the moving pole 10 to uncover the flow channel 13'.

Again the higher pressure in fluid chamber 8 than that in passage 9 at the beginning of the motoring cycle prevents the poppet 11' from moving towards the static pole 18. The moving pole 10' starts to compress pole spring 12' and poppet spring 15 as it slides away from the head of the poppet 11', removing the auxiliary poppet valve 19 from its seat 20 and opening the flow channel 13'. When the pressure is equalised, main poppet 11' can open under the force of pole spring 12' which is grater than that of poppet spring 15. As before, the main and auxiliary valves move together "automatically" when the motor has sufficient momentum.

All forms of the verb "to comprise" used in this specification should be understood as forms of the verbs "to consist of" and/or "to include".

The invention claimed is:

1. A hydraulic or pneumatic motor or pump, comprising:
a high-pressure line;
a working chamber having a piston that is movable to cyclically vary a volume of the working chamber; and
a valve arrangement disposed between the high-pressure line and the working chamber for controlling fluid flow from the high-pressure line to the working chamber, the valve arrangement comprising
a main valve having a valve element arranged to provide sealing contact with a valve seat, and
an auxiliary valve comprising an electromagnetically-movable valve member for equalising pressure on either side of the main valve by placing the working chamber in direct fluid communication with the high-pressure line, wherein
the valve element has an internal conduit communicating with an opening defined by the valve seat, and
the electromagnetically-movable valve member is adapted to place the internal conduit in direct fluid communication with a space surrounding said valve element such that the internal conduit connects the working chamber with the high pressure line,
wherein
the valve element is a poppet valve having a poppet shank, and
the electromagnetically-moveable member is a moving pole ring slidable on the poppet shank, and
wherein
a pole compression spring is configured to act on the pole ring and the poppet shank.

2. A valve arrangement for controlling fluid flow from a high-pressure line to a working chamber of cyclically varying volume of a hydraulic or pneumatic motor or pump, the working chamber having a piston that is movable to cyclically vary a volume of the working chamber, the valve arrangement comprising:
a main valve having a valve element arranged to provide sealing contact with a valve seat, and
an auxiliary valve comprising an electromagnetically-movable valve member for equalising pressure on either side of the main valve by placing the working chamber in direct fluid communication with the high pressure line,
wherein
the valve element has an internal conduit communicating with an opening defined by the valve seat, and
the electromagnetically-movable valve member is adapted to place the internal conduit in direct fluid communication with a space surrounding said valve element such that the internal conduit connects the working chamber with the high pressure line,
wherein
the valve element is a poppet valve having a poppet shank, and
the electromagnetically-moveable member is a moving pole ring slidable on the poppet shank, and
wherein
a pole compression spring is configured to act on the pole ring and the poppet shank.

3. A hydraulic or pneumatic motor or pump, comprising:
a high-pressure line;
a working chamber having a piston that is movable to cyclically vary a volume of the working chamber; and
a valve arrangement disposed between the high-pressure line and the working chamber for controlling fluid flow from the high-pressure line to the working chamber, the valve arrangement comprising
a main valve having a valve element arranged to provide sealing contact with a valve seat, and
an auxiliary valve comprising an electromagnetically-movable valve member for equalising pressure on either side of the main valve by placing the working chamber in direct fluid communication with the high-pressure line, the main and auxiliary valves being integrated,
wherein
the valve element has an internal conduit communicating with an opening defined by the valve seat,
the electromagnetically-movable valve member is adapted to place the internal conduit in direct fluid communication with a space surrounding said valve element such that the internal conduit connects the working chamber with the high pressure line, and the valve arrangement further comprises a main biasing element for biasing the valve element towards the valve seat, and an auxiliary biasing element for biasing the electromagnetically-movable valve member to a position in which the internal conduit is isolated from the space surrounding said valve element.

4. A hydraulic or pneumatic motor or pump according to claim 1, wherein the electromagnetically-movable valve member comprises a spool valve member.

5. A hydraulic or pneumatic motor or pump according to claim 1, wherein the electromagnetically-movable member comprises a poppet valve member located at least partly within the internal conduit.

6. A hydraulic or pneumatic motor or pump according to claim 1, wherein the main and/or auxiliary biasing element comprises a helical spring.

7. A hydraulic or pneumatic motor or pump according to claim 1, wherein the auxiliary biasing element is configured to exert a greater force than the main biasing element.

8. A hydraulic or pneumatic motor or pump according to claim 1, wherein the valve element is a poppet valve having a poppet shank, and the electromagnetically-moveable member is a moving pole ring slidable on the poppet shank, and wherein a pole compression spring is configured to act on the pole ring and the poppet shank.

9. A hydraulic or pneumatic motor or pump according to claim 1, wherein the hydraulic or pneumatic motor or pump is a hydraulic pump or motor.

10. A hydraulic or pneumatic motor or pump according to claim 1, wherein the valve arrangement is operable to undergo two-stage operation at a first cycling rate of the working chamber's volume in which the electromagnetically-movable valve member is movable to equalise the pressure on either side of the main valve while the valve element is held against the valve seat, the valve element being movable away from the valve seat after the pressure on either side of the main valve has been equalised, and single-stage operation at a second cycling rate of the working chamber's volume in which the electromagnetically-movable valve member and the valve element are movable in unison, the first cycling rate being lower than the second cycling rate.

11. A hydraulic or pneumatic motor or pump according to claim 1, wherein the electromagnetically-movable valve member covers an entry to the internal conduit when the electromagnetically-movable valve member is adjacent to the valve element, and wherein the electromagnetically-movable valve member opens the entry to the internal conduit when the electromagnetically-movable valve member is away from the valve element.

12. A valve arrangement for controlling fluid flow from a high-pressure line to a working chamber of cyclically varying volume of a hydraulic or pneumatic motor or pump, the working chamber having a piston that is movable to cyclically vary a volume of the working chamber, the valve arrangement comprising:

a main valve having a valve element arranged to provide sealing contact with a valve seat, an auxiliary valve comprising an electromagnetically-movable valve member for equalising pressure on either side of the main valve by placing the working chamber in direct fluid communication with the high pressure line, the main and auxiliary valves being integrated, wherein the valve element has an internal conduit communicating with an opening defined by the valve seat, the electromagnetically-movable valve member is adapted to place the internal conduit in direct fluid communication with a space surrounding said valve element such that the internal conduit connects the working chamber with the high pressure line, and the valve arrangement further comprises a main biasing element for biasing the valve element towards the valve seat, and an auxiliary biasing element for biasing the electromagnetically-movable valve member to a position in which the internal conduit is isolated from the space surrounding said valve element.

13. A valve arrangement according to claim 12 wherein the electromagnetically-movable member comprises a spool valve member.

14. A valve arrangement according to claim 12, wherein the electromagnetically-movable member comprises a poppet valve member located at least partly within the internal conduit.

15. A valve arrangement according to claim 12, wherein the main and/or auxiliary biasing element comprises a helical spring.

16. A valve arrangement according to claim 12, wherein the auxiliary biasing element is configured to exert a greater force than the main biasing element.

17. A valve arrangement according to claim 12, wherein the valve element is a poppet valve having a poppet shank, and the electromagnetically-moveable member is a moving pole ring slidable on the poppet shank, and wherein a pole compression spring is configured to act on the pole ring and the poppet shank.

18. A valve arrangement according to claim 12, wherein the valve arrangement is disposed between the high-pressure line and the working chamber for controlling fluid flow from the high-pressure line to the working chamber.

19. A valve arrangement according to claim 12, wherein the valve arrangement is operable to undergo two-stage operation at a first cycling rate of the working chamber's volume in which the electromagnetically-movable valve member is movable to equalise the pressure on either side of the main valve while the valve element is held against the valve seat, the valve element being movable away from the valve seat after the pressure on either side of the main valve has been equalised, and single-stage operation at a second cycling rate of the working chamber's volume in which the electromagnetically-movable valve member and the valve element are movable in unison, the first cycling rate being lower than the second cycling rate.

20. A valve arrangement according to claim 12, wherein the electromagnetically-movable valve member covers an entry to the internal conduit when the electromagnetically-movable valve member is adjacent to the valve element and wherein the electromagnetically-movable valve member opens the entry to the internal conduit when the electromagnetically-movable valve member is away from the valve element.

* * * * *

UNITED STATES PATENT AND TRADEMARK OFFICE
CERTIFICATE OF CORRECTION

| | | |
|---|---|---|
| PATENT NO. | : 8,757,583 B2 | Page 1 of 1 |
| APPLICATION NO. | : 12/440371 | |
| DATED | : June 24, 2014 | |
| INVENTOR(S) | : Uwe Bernhard Pascal Stein | |

It is certified that error appears in the above-identified patent and that said Letters Patent is hereby corrected as shown below:

In the Claims:

On column 5, line 11, "claim 1" should read "claim 3".

On column 5, line 14, "claim 1" should read "claim 3".

On column 5, line 18, "claim 1" should read "claim 3".

On column 5, line 21, "claim 1" should read "claim 3".

On column 5, line 24, "claim 1" should read "claim 3".

On column 5, line 30, "claim 1" should read "claim 3".

On column 5, line 33, "claim 1" should read "claim 3".

On column 5, line 49, "claim 1" should read "claim 3".

Signed and Sealed this
Thirtieth Day of September, 2014

Michelle K. Lee
*Deputy Director of the United States Patent and Trademark Office*